(12) United States Patent  (10) Patent No.: US 8,155,612 B1
Husted et al.  (45) Date of Patent: Apr. 10, 2012

(54) WIRELESS DEVICE USING A SHARED GAIN STAGE FOR SIMULTANEOUS RECEPTION OF MULTIPLE PROTOCOLS

(75) Inventors: Paul J. Husted, San Jose, CA (US); Srenik Mehta, Union City, CA (US); Soner Ozgur, Santa Clara, CA (US)

(73) Assignee: Qualcomm Atheros, Inc., San Jose, CA (US)

( * ) Notice: Subject to any disclaimer, the term of this patent is extended or adjusted under 35 U.S.C. 154(b) by 552 days.

(21) Appl. No.: 12/323,338

(22) Filed: Nov. 25, 2008

Related U.S. Application Data

(60) Provisional application No. 61/116,239, filed on Nov. 19, 2008.

(51) Int. Cl.
*H04B 1/06* (2006.01)
(52) U.S. Cl. .... 455/234.1; 455/84; 455/132; 455/232.1; 455/234.2
(58) Field of Classification Search .................... 455/78, 455/82, 84, 552.1, 132, 137, 138, 141, 144, 455/232.1, 234.1, 234.2
See application file for complete search history.

(56) References Cited

U.S. PATENT DOCUMENTS

| | | | |
|---|---|---|---|
| 6,643,522 B1 | 11/2003 | Young | |
| 6,970,681 B2 * | 11/2005 | Darabi et al. | 455/73 |
| 7,239,890 B2 | 7/2007 | Kitami et al. | |
| 7,519,390 B2 | 4/2009 | Malone et al. | |
| 7,912,428 B2 | 3/2011 | Behzad et al. | |
| 2004/0120421 A1 | 6/2004 | Filipovic | |
| 2004/0152429 A1 | 8/2004 | Haub et al. | |
| 2004/0203367 A1 | 10/2004 | Nowlin | |
| 2005/0059347 A1 | 3/2005 | Haartsen | |
| 2005/0159180 A1 | 7/2005 | Cheng et al. | |
| 2007/0109973 A1 | 5/2007 | Trachewsky | |
| 2007/0207751 A1 | 9/2007 | Behzad | |
| 2007/0207752 A1 | 9/2007 | Behzad | |
| 2008/0043705 A1 | 2/2008 | Desai et al. | |
| 2008/0080453 A1 * | 4/2008 | Rofougaran | 370/342 |
| 2008/0084922 A1 | 4/2008 | Kleveland et al. | |
| 2008/0123610 A1 * | 5/2008 | Desai et al. | 370/339 |
| 2008/0139118 A1 | 6/2008 | Sanguinetti | |
| 2008/0139123 A1 * | 6/2008 | Lee et al. | 455/63.1 |
| 2008/0139151 A1 * | 6/2008 | Ojo et al. | 455/234.1 |
| 2008/0311852 A1 | 12/2008 | Hansen et al. | |
| 2009/0117938 A1 | 5/2009 | Georgantas et al. | |
| 2009/0239471 A1 * | 9/2009 | Tran et al. | 455/41.2 |
| 2010/0322222 A1 * | 12/2010 | Desai | 370/338 |
| 2011/0002257 A1 * | 1/2011 | Behzad et al. | 370/315 |
| 2011/0075596 A1 * | 3/2011 | Moreira et al. | 370/310 |

* cited by examiner

*Primary Examiner* — Howard Williams
(74) *Attorney, Agent, or Firm* — Meyertons Hood Kivlin Kowert & Goetzel, P.C.

(57) ABSTRACT

A wireless device that can process signals according to multiple wireless protocols simultaneously and without signal loss. The wireless device may comprise an antenna and first and second wireless protocol circuitry. The first wireless protocol circuitry comprises a shared gain element that amplifies signals that are processed by each of the first and second wireless protocol circuitry. Since the third signals are amplified by the shared gain element prior to being split out to the respective protocol circuitry, the first and second portions of the amplified third signals do not have significant signal loss relative to the third signals provided by the antenna. Thus the wireless device can receive and process wireless signals according to both the first and second protocols simultaneously without any significant signal losses due to splitting of the receive signal.

19 Claims, 6 Drawing Sheets

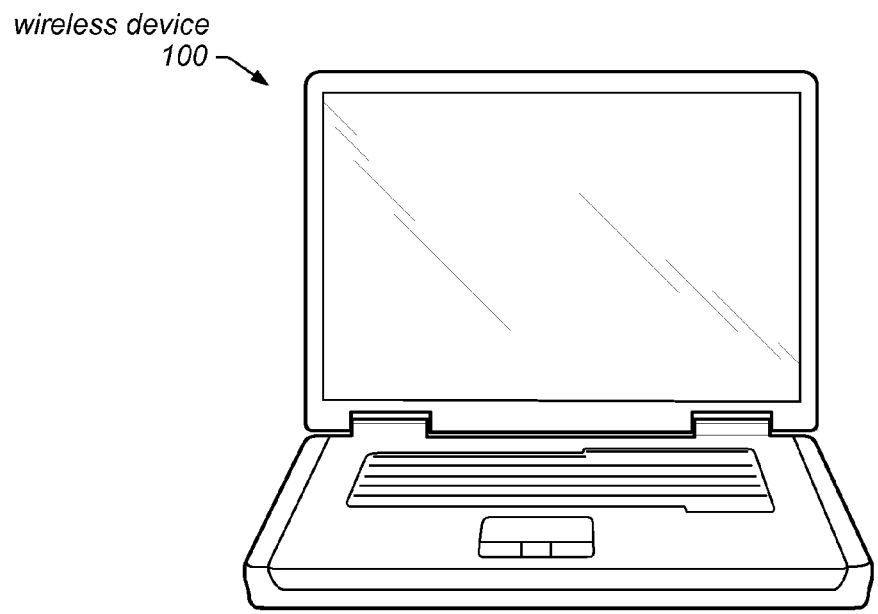
FIG. 1A
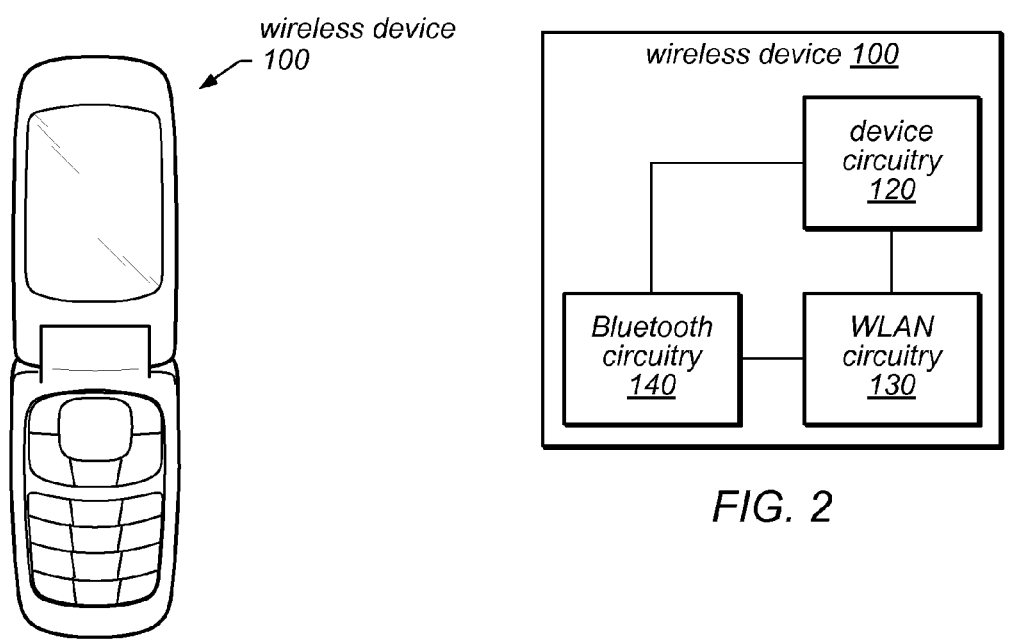
FIG. 1B
FIG. 2

WIRELESS DEVICE USING A SHARED GAIN STAGE FOR SIMULTANEOUS RECEPTION OF MULTIPLE PROTOCOLS

PRIORITY CLAIM

This application claims benefit of priority of U.S. provisional application Ser. No. 61/116,239, titled "Wireless Device Using A Shared Gain Stage For Simultaneous Reception Of Multiple Protocols", filed Nov. 19, 2008, whose inventors are Paul J. Husted, Srenik Mehta, and Soner Ozgur and which is hereby incorporated by reference in its entirety as though fully and completely set forth herein.

BACKGROUND OF THE INVENTION

1. Field of the Disclosure

The present invention relates generally to wireless communication, and more particularly to reception of wireless signals of different wireless protocols using a shared gain stage to reduce signal loss.

2. Description of the Related Art

Wireless communication is being used for a plethora of applications, such as in laptops, cell phones, and other wireless communication devices ("wireless devices"). In fact, wireless communication is becoming so widely used, it is common for wireless devices to be able to communicate using a plurality of different wireless communication protocols. Accordingly, it is common for a wireless device to have different circuit portions that implement different wireless protocols.

When a wireless device receives a wireless signal on its antenna, the signal is converted to baseband and then provided (split) to the different circuit portions that implement the different wireless protocols. In one prior art implementation, a splitter is placed before the signal is provided to the different circuit portions. Thus only half of the original signal energy is provided to each of the different circuit portions. As a result, each of the split signals suffers a 3 dB loss in sensitivity. In another prior art implementation, the device uses a switch to switch the signal to the different circuit portions. However, only one circuit portion may be used at a time, and the device is not able to simultaneously receive multiple signals of different wireless protocols. Therefore, improvements in wireless devices are desired.

SUMMARY OF THE INVENTION

Embodiments of the invention relate to a wireless device that can process signals according to multiple wireless protocols simultaneously and without signal loss. The wireless device may comprise an antenna for receiving wireless signals, first wireless protocol circuitry, and second wireless protocol circuitry. The first wireless protocol circuitry is coupled to the antenna and configured to receive first signals from the antenna and process the first signals according to the first wireless protocol. The second wireless protocol circuitry is coupled to the antenna and configured to receive second signals from the antenna and process the second signals according to the second wireless protocol. The first wireless protocol circuitry may comprise at least one shared gain element, i.e., a gain element that amplifies signals that are processed by each of the first and second wireless protocol circuitry. In other words, the at least one shared gain element may be utilized for amplifying signals for both the first wireless protocol circuitry and the second wireless protocol circuitry.

When the wireless device is receiving third signals having components according to both the first and second wireless protocols, the first wireless protocol circuitry receives the third signals from the antenna, and the shared gain element amplifies the third signals to produce amplified third signals. At least a first portion of the amplified third signals is processed by the first wireless protocol circuitry, and at least a second portion of the amplified third signals is provided from the first wireless protocol circuitry to the second wireless protocol circuitry for processing. Thus when both the first and second wireless protocol circuitry is operating, the third signals are provided first to the first wireless protocol circuitry, where the third signals are amplified and then split out for processing to the respective first and second wireless protocol circuitry.

Since the third signals are amplified by the shared gain element prior to being split out to the respective protocol circuitry, the first and second portions of the amplified third signals do not have significant signal loss relative to the third signals provided by the antenna. Thus the wireless device can receive and process wireless signals according to both the first and second protocols simultaneously without any significant signal losses due to splitting of the receive signal.

In one embodiment, the first wireless protocol circuitry is configured to dynamically adjust a gain of the shared gain element to provide signals of appropriate signal strength to the first wireless protocol circuitry and the second wireless protocol circuitry. For example, the second wireless protocol circuitry may be configured to provide to the first wireless protocol circuitry information regarding signal strength of signals received by the second wireless protocol circuitry from the first wireless protocol circuitry. The first wireless protocol circuitry may dynamically adjust the gain of the shared gain element based at least in part on this signal strength information.

In addition, the second wireless protocol circuitry may be configured to indicate to the first wireless protocol circuitry when the second wireless protocol circuitry is actively receiving a packet. The first wireless protocol circuitry may be configured to not adjust the gain of the shared gain element while the second wireless protocol circuitry is actively receiving a packet.

One embodiment of the invention relates to a chip for use in a wireless device that implements a first wireless protocol. The chip is intended to operate in a wireless device that implements the first wireless protocol as well as a second wireless protocol. The chip may comprise first wireless protocol circuitry configured to process received first signals according to the first wireless protocol and a gain element coupled to the first wireless protocol circuitry. The chip is configured to receive second signals having components according to both the first wireless protocol and the second wireless protocol. The gain element on the chip is configured to amplify the second signals to produce amplified second signals, wherein a first portion of the amplified second signals is processed by the first wireless protocol circuitry, and a second portion of the amplified second signals is provided external to the chip for processing.

Another embodiment relates to a chip for use in a wireless device that implements a second wireless protocol, wherein the chip is intended to operate in a wireless device that implements a first wireless protocol and the second wireless protocol. The chip may comprise a first input that receives first signals that only have components according to the second wireless protocol. The chip may also comprise a second input configured to receive amplified second signals having components according to both the first and second wireless protocols. The chip may further comprise second wireless protocol circuitry coupled to the first input and the second input. The second wireless protocol circuitry may be configured to process the first signals and the amplified second signals according to the second wireless protocol. The chip may further comprise a switch coupled between the first input, the second input and the second wireless protocol circuitry for selectively providing either the first signals or the amplified second signals to the second wireless protocol circuitry.

BRIEF DESCRIPTION OF THE DRAWINGS

A better understanding of the present invention can be obtained when the following Detailed Description of the Embodiments is read in conjunction with the following drawings, in which:

FIGS. 1A and 1B illustrates exemplary wireless devices, according to one embodiment;

FIG. 2 is an exemplary block diagram of the wireless devices of FIGS. 1A and 1B, according to one embodiment;

Figure 3:
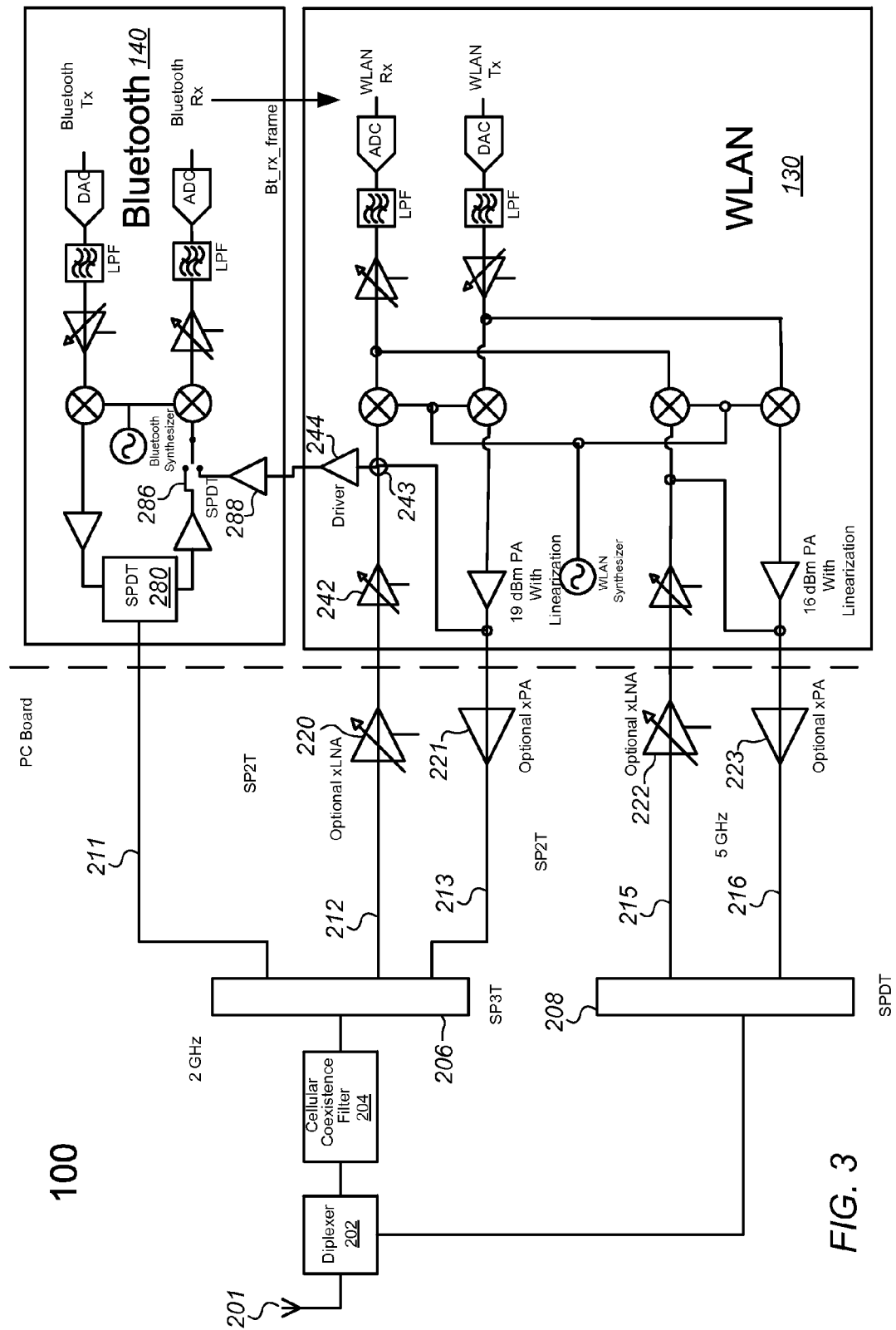
FIG. 3 is a more detailed exemplary block diagram of the wireless devices of FIGS. 1A and 1B, illustrating Bluetooth circuitry and WLAN circuitry of the exemplary wireless devices, according to one embodiment.

While the invention is susceptible to various modifications and alternative forms, specific embodiments thereof are shown by way of example in the drawings and are herein described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF EMBODIMENTS OF THE INVENTION

FIGS. 1A and 1B—Exemplary Wireless Devices

FIGS. 1A and 1B illustrate an exemplary wireless device 100, according to one embodiment. As shown in FIG. 1A, the wireless device 100 may be a portable computer or other mobile computing device. Alternatively, as shown in FIG. 1B, the wireless device 100 may be a cell phone or smart phone or other similar mobile device (which may also be classified as a mobile computing device). However, it should be noted that other wireless devices are envisioned, such as personal digital assistants, multimedia players (portable or stationary), routers, and/or other mobile devices/computing systems which are operable to use wireless communication.

The wireless device 100 may be configured to perform wireless communication using a first wireless protocol and/or a second wireless protocol. For example, the wireless device 100 may be configured to perform wireless communication using only the first wireless protocol, using only the second wireless protocol, or simultaneously using both the first and second wireless protocol. The first and second wireless protocols may be any of various types of protocols. In some embodiments, the first wireless protocol may be a WLAN protocol. Additionally, the second wireless protocol may be a short range wireless communication protocol, such as Bluetooth. As used herein, a short range wireless protocol may refer to wireless protocols which support distances of up to 1 meter to 10 meters, or in higher powered devices, 100 meters.

FIG. 2—Exemplary Block Diagram of the Wireless Device

As shown in FIG. 2, the wireless device 100 may include device circuitry 120 (for performing various functions of the wireless device), first wireless protocol circuitry 130, and second wireless protocol circuitry 140. Each of the first wireless protocol circuitry 130 and the second wireless protocol circuitry 140 may be implemented in any of various ways, such as analog logic, digital logic, a processor and memory (such as a CPU, DSP, microcontroller, etc.), an ASIC (application specific integrated circuit), an FPGA (field programmable gate array), or any combination of the above.

The first wireless protocol circuitry 130 may be comprised on a first chip, and the second wireless protocol circuitry 140 may be comprised on a second chip. As used herein, the term "chip" has the full extent of its ordinary meaning, and includes an electronic device, e.g., a semiconductor device, that may be implemented in any of the ways described above for the first wireless protocol circuitry 130 and the second wireless protocol circuitry 140.

In one exemplary embodiment, the first wireless protocol circuitry 130 may be WLAN circuitry 130 and the second wireless protocol circuitry 140 may be Bluetooth circuitry 140. The WLAN circuitry 130 and the Bluetooth 140 circuitry may be co-located, e.g., may be located in the same wireless device 100. The device 100 may include logic for providing a received signal to each of the first wireless protocol circuitry 130 and the second wireless protocol circuitry 140 without any loss in sensitivity.

In one embodiment, the wireless device 100 may include a shared gain element that is used by both the first wireless protocol circuitry 130 and the second wireless protocol circuitry 140. The shared gain element may be comprised in the first wireless protocol circuitry 130 in one embodiment. The term "shared gain element" refers to a gain element (such as an amplifier, gain stage, etc.) that amplifies signals such that portions of the amplified signals are provided to each of the first and second wireless protocol circuitry 130 and 140 (or 141, FIGS. 4 and 5), respectively.

Additionally, the wireless device 100 may include one or more wireless or wired ports for communicating over a network. The wireless device 100 (e.g., the device circuitry 120) may further include one or more memory mediums and processors for implementing various functionality. The wireless device 100 may operate as described herein.

FIG. 3—Exemplary System Diagram of the Wireless Device

FIG. 3 is an exemplary system diagram of the wireless device 100. As shown, the wireless device 100 may comprise the first wireless protocol circuitry 130 (e.g., WLAN) and the second wireless protocol circuitry 140 (e.g., Bluetooth). As discussed below, the first wireless protocol circuitry 130 may be considered as comprising a shared gain element (LNA) 242, or alternatively the first wireless protocol circuitry 130 may be considered as being coupled to the shared gain element (LNA) 242.

As shown, the device 100 may comprise an antenna 201 for receiving signals. The received signal from the antenna 201 is provided to a diplexer 202. The diplexer 202 may provide one output to a cellular coexistence filter 204, and may provide a second output to the single pole double throw (SP2T) switch 208. The output of the cellular coexistence filter 204 is provided to a single pole triple throw (SP3T) switch 206. The SP3T switch 206 has a first connection 211 to the Bluetooth block 140, and has second and third connections 212 and 213 to the WLAN block 130.

When only the Bluetooth block 140 is operating, i.e., when only Bluetooth signals are being received or transmitted, the antenna 201 is in communication with the Bluetooth block 140 through the SP3T switch 206 and through the connection 211. Thus, when only the Bluetooth block 140 is operating, the antenna 201 communicates with the Bluetooth block 140 in a bidirectional fashion through the connection 211. A received Bluetooth signal on the antenna 201 is provided through SP3T switch 206 over connection 211 to SP2T switch 280 in the Bluetooth block 140.

When only the WLAN block 130 is operating, i.e., when only wireless LAN signals are being received or transmitted, the antenna 201 is in communication with the WLAN block 130 through the SP3T switch 206 and the connections 212 and 213, as well as through the SP2T switch 208 and connections 215 and 216. The connection 212 is used for WLAN signals received by the antenna 201 destined for the WLAN block 130, and the connection 213 is used for WLAN signals generated by the WLAN block 130 and destined for the antenna 201. The connections 215 and 216 are used for processing 5 GHz WLAN signals such as those described by IEEE 802.11a (in contrast to the 2.4 GHz WLAN signals through connections 212 and 213). The WLAN (in this implementation at least, but not necessarily for all possible implementations) may operate at either 2 or 5 GHz, and in one embodiment not in both frequencies at the same time. The diplexer 202 efficiently splits the high and low frequencies, and thus receiving of shared signals (shared Rx) may occur when the WLAN is operating at 2 GHz. The 5 GHz path is only shown for completeness.

Note that references to "only Bluetooth signals being received" refers to signals being received that comprise Bluetooth signals intended for the wireless device 100, but not WLAN signals intended for the wireless device 100. It is noted that there may be various other signals present in the signal from other sources, such as other Bluetooth signals or other WLAN signals that are not intended for the wireless device 100. Similarly, references to "only WLAN signals being received" refers to signals being received that comprise WLAN signals intended for the wireless device 100, but not Bluetooth signals intended for the wireless device 100. It is noted that there may be various other signals present in the signal from other sources, such as other Bluetooth signals or other WLAN signals that are not intended for the wireless device 100.

When both the WLAN block 130 and the Bluetooth block 140 are operating, i.e., when both WLAN signals and Bluetooth signals are being received simultaneously, then in one embodiment signals received from the antenna 201 are provided to the WLAN block 130 via connection 212. The signals may be provided through optional external low noise amplifier (xLNA) 220 to the WLAN block 130. The signals received from connection 212 and optional xLNA 220 may be provided through the low noise amplifier (LNA) 242 in the WLAN block 130. The WLAN block 130 may perform various WLAN processing on the received signals.

The WLAN block 130 may in turn provide the received signal from LNA 242 to splitter 243. The splitter 243 may operate to split the signal energy, with a first portion of the signal energy being provided to the remainder of the WLAN block 130, and a second portion of the signal energy being provided to the output driver 244. The second portion of the signal energy is provided by the output driver 244 to the Bluetooth block 140. The splitter 243 may or may not be equal, e.g., it may provide more energy to one path and less to the other path if desired. In one embodiment, the WLAN block 130 dynamically controls the operation of the splitter 243, including the amount of signal energy provided to each of the WLAN block 130 and the Bluetooth block 140.

Note that the signal is provided from the WLAN block 130 to the Bluetooth block 140 after being amplified by one or more LNAs 220 and 242. In one embodiment, the signal is amplified by 20 dB prior to being split by splitter 243 and provided to the Bluetooth block 140 through driver 244. Thus, after being amplified by 20 dB, a 3 dB loss due to the splitting of the signal does not impact the signal to noise ratio (SNR) of the signal. Thus the output of LNA 242 may be split by the splitter 243 into two paths, with each path having half of the original signal energy, with one half going to the WLAN receiver, and the other half going to driver 244 and then off the WLAN chip 140 to the Bluetooth section 130.

In one embodiment, the WLAN block 130 and Bluetooth block 140 are comprised on separate chips, and the output driver 244 on the WLAN block 130 is intended to provide sufficient gain for the signal to be transferred off-chip and across a printed circuit board (PCB) to the chip comprising the Bluetooth block 140.

As shown, the Bluetooth block 140 comprises a LNA 288, preferably a variable gain amplifier, that receives the signal from the driver 244 on the WLAN block 130. The LNA 288 amplifies the received signal to an appropriate size, which is then provided to the remainder of the Bluetooth block 140 for processing. For example, as shown, the output of the LNA 288 may be provide to a single pole double throw (SP2T) switch 286, where the signal is "switched in" to the Bluetooth logic for processing.

Thus, when both the WLAN block 130 and the Bluetooth block 140 are operating, instead of first splitting the received signal and providing these split portions to the WLAN block 130 and the Bluetooth block 140, the signal is not split, but rather is provided to only the WLAN block 130. The WLAN block 130 can amplify the signal through LNA 242 (and/or driver 244) and provide portions of the amplified signal to the Bluetooth block 140 and the remainder of the WLAN block 130. The Bluetooth block 140 can then operate on the signal received from the WLAN block 130. Since the received signal is first amplified on the WLAN block 130 before being "split out", the signal does not experience any losses.

In contrast, prior art systems would typically comprise a splitter in place of the SP3T switch 206, wherein the splitter split the receive signal and provided portions to the WLAN block 130 and the Bluetooth block 140. Thus in these prior art systems, even when the device was only receiving Bluetooth or only receiving WLAN, the signal would still be split, with half the signal energy being provided to the Bluetooth block 140 and half the signal energy being provided to the WLAN block 130. This results in a 3 dB loss in signal energy, i.e., degrades the sensitivity of each block by 3 dB. Embodiments of the invention described herein operate to allow reception of both Bluetooth and WLAN signals without requiring a loss in signal energy.

Figure 4:
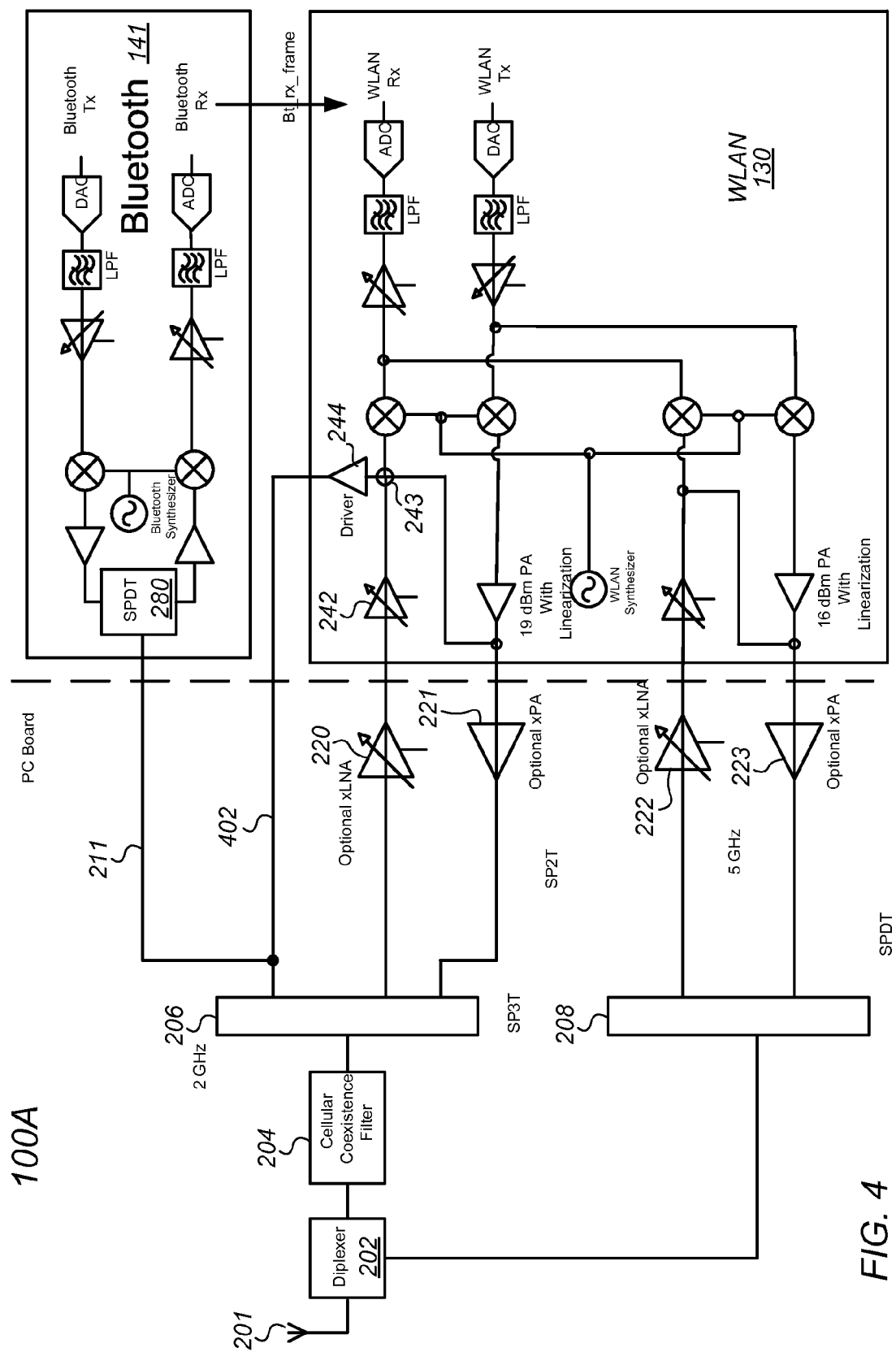
FIGS. 4 and 5 are block diagrams of alternate embodiments of the wireless devices of FIGS. 1A and 1B.
Figure 5:
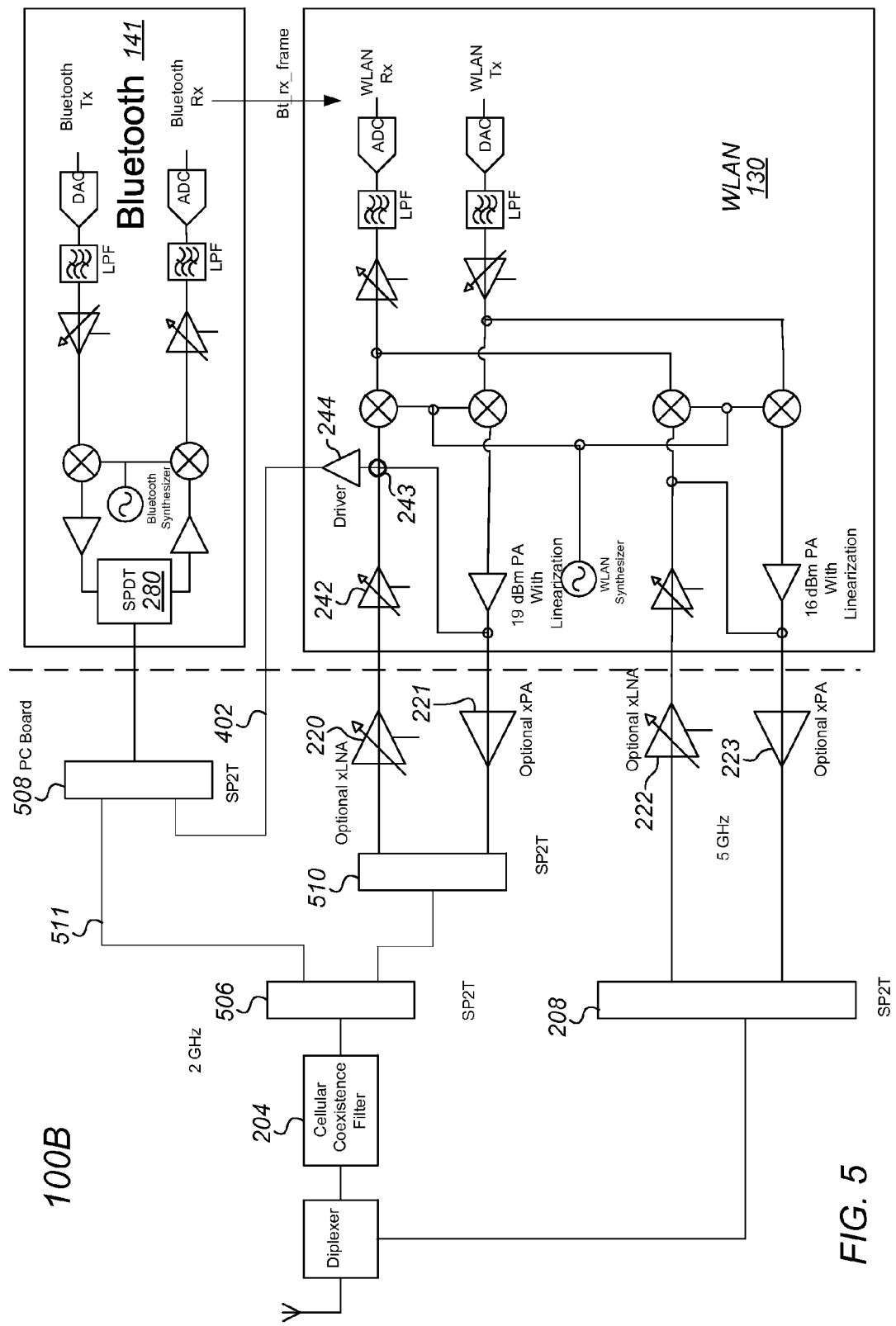

FIGS. 4 and 5—Alternate Embodiments with Legacy Bluetooth Sections

FIGS. 4 and 5 illustrate alternate embodiments of the device (referred to as 100A and 100B, respectively) where an existing or legacy Bluetooth chip is included in the system that does not have an input LNA 288 for receiving a signal from WLAN section 130. In other words, in FIG. 3 the Bluetooth block 140 is designed to receive an output signal from the WLAN block 130 and includes low noise amplifier 288 and switch 286. In the embodiments of FIGS. 4 and 5, a legacy Bluetooth chip 141 is used which does not have LNA 288 and switch 286. The embodiment of FIG. 3 may have a lower cost, smaller area, and lower insertion loss than the embodiments of FIGS. 4 and 5, but utilizes a specially designed Bluetooth block 140.

In the embodiment of FIG. 4 (device (100A), the output from driver 244 is provided over connection 402 to connection 211, and is thereby coupled to the I/O port of the Bluetooth block 141. In this embodiment, it is important that line 402 between the driver 244 and the SP3T 206 match properly when the Bluetooth block 141 is transmitting. As shown, when Bluetooth block 141 is transmitting, the transmitted signal is provided through SP2T switch 280 and over connection 211 to the SP3T switch 206. However, as shown, this output Bluetooth signal provided over connection 211 may also be coupled onto connection 402. It is noted that driver 404 is powered down in this mode, with its output (and the input seen by the BT transmitter) tied to ground. Thus when Bluetooth block 141 is transmitting the driver 244 may be shorted to ground, and further device 100A may comprise LC phase shifting circuitry (not shown) coupled to trace 402 to prevent the signal output on connection 211 from being transmitted onto trace 402. The LC phase shifting circuitry may be designed based on the length of the trace 402 to provide appropriate signal matching.

FIG. 5 illustrates an alternative embodiment to FIG. 4 (device 100B). The embodiment of FIG. 5 is slightly more complex than the embodiment of FIG. 4, but does not have the signal matching issues that may occur on trace 402 of FIG. 4. In the embodiment of FIG. 5, the SP3T switch 206 in the embodiments of FIGS. 3 and 4 is essentially replaced with three SP2T switches 506, 508 and 510, as shown. More specifically, the cellular coexistence filter 204 is coupled to a first port of SP2T switch 506. The SP2T switch 506 in turn has a second port that connects over line 511 to a port of SP2T switch 508. Output of output driver 244 on the WLAN block 130 is coupled over line 402 to another port on SP2T switch 508. A third port of SP2T switch 508 connects to Bluetooth block 141, e.g., to the SP2T switch 280 in Bluetooth block 141. A third port of SP2T switch 506 connects to a first port of SP2T switch 510. The second and third ports of SP2T switch 510 connect to LNA 220 and xPA (Power Amplifier) 221 as shown.

Figure 6:
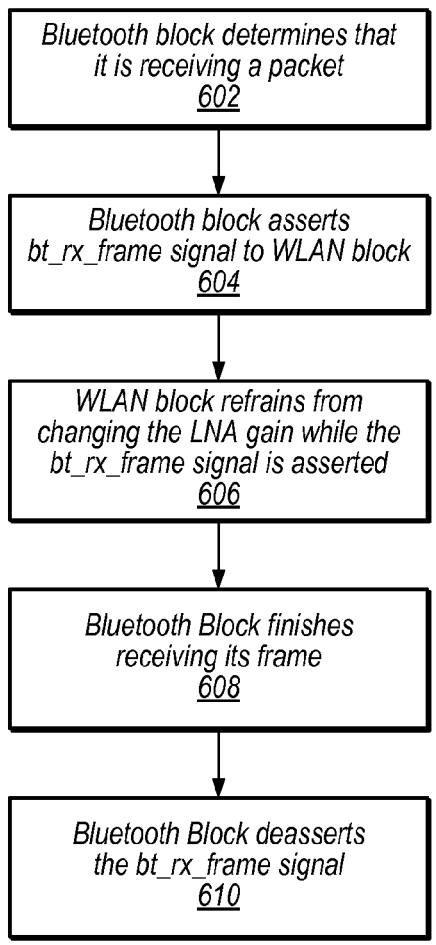
FIG. 6 is a flowchart diagram illustrating a method whereby second protocol circuitry informs first protocol circuitry that it is receiving a packet in order to prevent the first protocol circuitry from changing the gain of the shared gain element.
Figure 7:
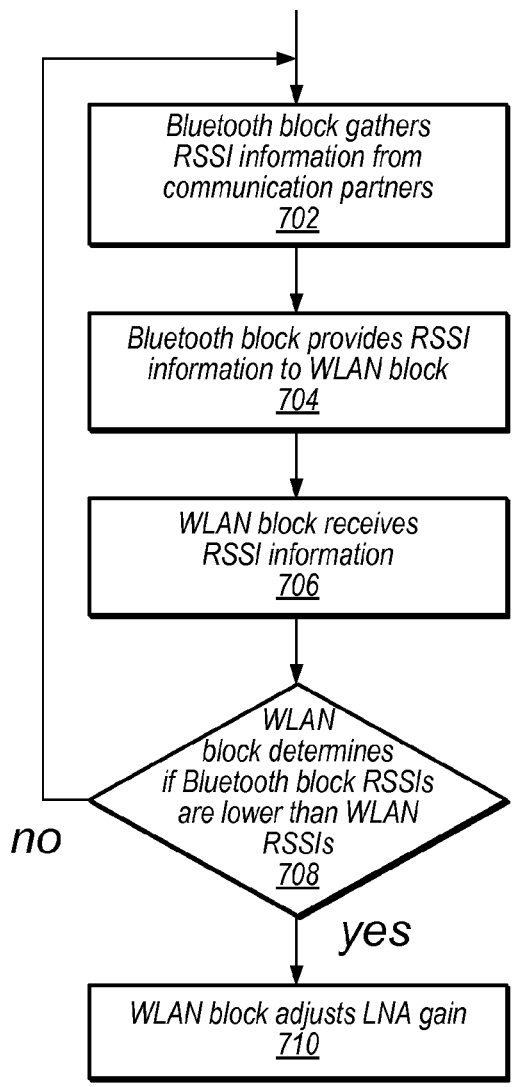
FIG. 7 is a flowchart diagram illustrating a method whereby second protocol circuitry provides information on received signal strength to first protocol circuitry, so that the first protocol circuitry can adjust the gain of the shared gain element accordingly.

As shown in FIGS. 6 and 7, the Bluetooth block 140 may provide various feedback to the WLAN block 130 to control operation of the WLAN block 130. More specifically, the Bluetooth block 140 may provide feedback to the WLAN block 130 to enable the blocks 130 and 140 to effectively share the LNA 242.

In one embodiment, the LNA 242 is a variable gain LNA as shown, and the WLAN block 130 may operate to adjust the gain of the LNA 242 as desired. Optional xLNA 220 may also have variable gain, or in another embodiment may be able to be turned off for very large signals. When an input signal is very large, the WLAN chip 130 may choose to turn off the xLNA 220 and/or set the SP3T 206 to move away from WLAN Rx mode, to get extra attenuation. These changes are preferably prevented when signal bt_rx_frame is asserted, as discussed below.

As indicated above, the splitter 243 for providing the first signal to the WLAN block 130 and the second signal to the Bluetooth block 140 may not provide signals of equal strength. In one embodiment, for example, the Bluetooth block 140 may receive a higher powered signal than the signal provided to the WLAN block 130. Alternatively, the signal for the WLAN block 130 may be higher powered. In some embodiments, the proportion of the power of the signals may be adjusted, e.g., based on indications from the WLAN block 130 and/or the Bluetooth block 140. The adjustment may be dynamically performed by the WLAN block 130.

It may be desirable to prevent the WLAN block 130 from adjusting the gain of the LNA 242 while the Bluetooth block 140 is receiving a packet, as this may cause the packet to have errors in reception. In other words, if the Bluetooth block 140 is in the process of receiving a frame, and during this time the WLAN block 130 adjusts the gain of the LNA 242, this will most likely "kill" the Bluetooth packet, i.e., the packet (frame) will not be received properly and an error will be generated.

Thus, as shown in FIG. 6, when the Bluetooth block 140 (e.g., Bluetooth receiver) determines in 602 that it is receiving a packet, the Bluetooth block 140 may in 604 provide a (digital) signal referred to as bt_rx_frame (shown in FIGS. 3-5) to the WLAN block 130 (e.g., WLAN receiver). The bt_rx_frame signal thus informs the WLAN block 130 when the Bluetooth block 140 is receiving a packet or frame. When the WLAN block 130 is operating and both the Bluetooth block 140 and WLAN block 130 are searching for a frame, the WLAN block 130 can set the gain of the LNA 242 as desired. Once the Bluetooth block 140 determines that it is actively receiving a frame, e.g., by detecting proper receipt of an access code, the Bluetooth block 140 asserts the bt_rx_frame signal. When the WLAN block 130 receives the asserted bt_rx_frame signal, at 606 the WLAN block 130 refrains from changing the gain of the LNA 242. It is noted that the WLAN block 130 may change other gain settings during the time the bt_rx_frame signal is asserted, but it will not change the gain of the LNA 242 or the settings of xLNA 220 or SP3T 206. When the Bluetooth block 140 finishes receiving its frame in 608, the Bluetooth block 141 deasserts the bt_rx_frame signal at 610, and the WLAN block 130 is now able to change the gain of the LNA 242.

For some legacy Bluetooth devices, bt_rx_frame may not be available. In other words, legacy Bluetooth devices may not have the capability to generate bt_rx_frame. In this case, the device 100A or 100B may use another signal that is present, such as a signal from a standard "3-wire" BT/WLAN coexistence interface. In one such example, a signal called BT_Active may be used. This signal is present whenever the Bluetooth device 141 is actively transmitting or attempting to receive a frame. In one embodiment, the WLAN block 130 could use BT_active rather than bt_rx_frame. This is suboptimal, since the WLAN Block 130 will see the BT_active signal asserted when the Bluetooth block 141 is just scanning for frames, but it should still provide a benefit. There is little or no harm from the fact that the BT_Active signal is asserted during Bluetooth transmit frames, since the WLAN receiver 130 will typically not be enabled during Bluetooth transmission (TX). If Bluetooth Transmit is ever enabled while WLAN Receive (Rx) is enabled, the shared Rx system and driver 244 will be disabled.

Figure 8:
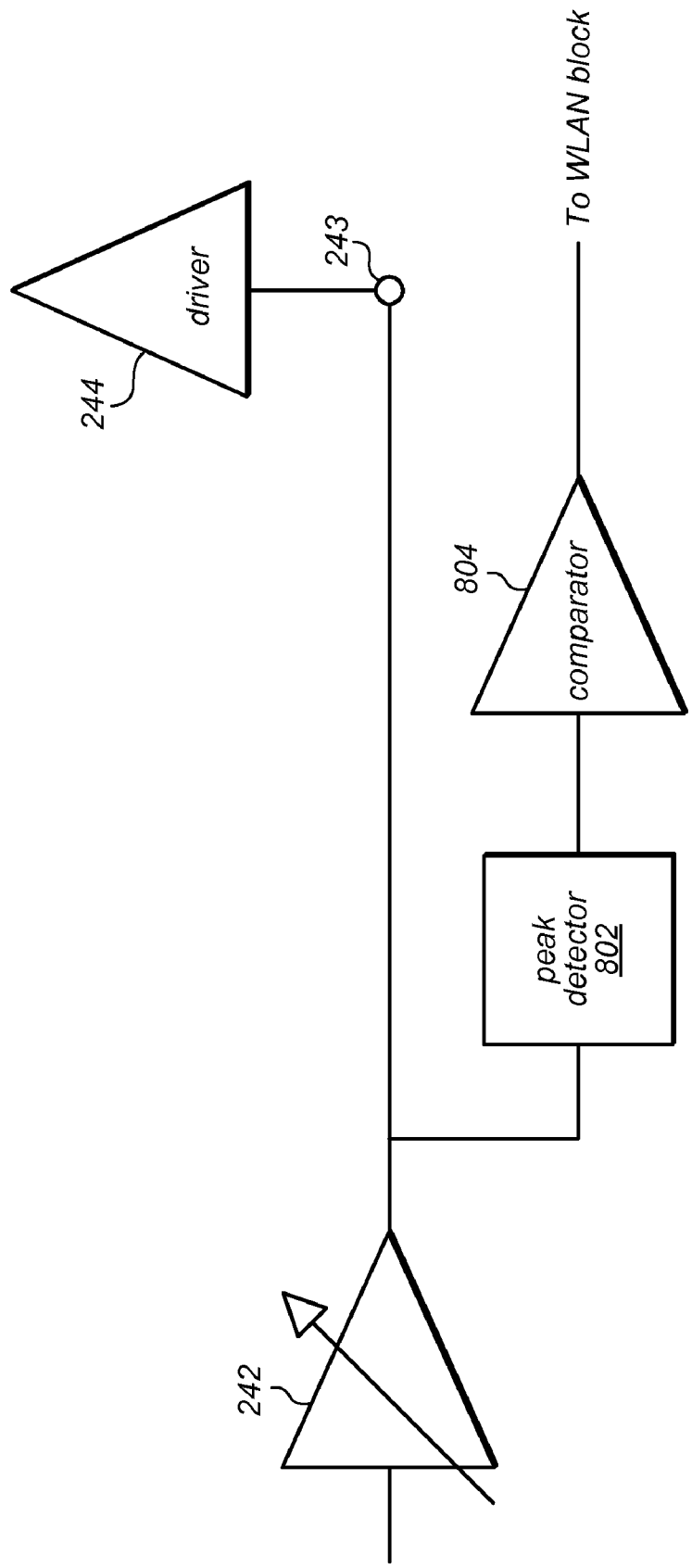
FIG. 8 illustrates an alternate embodiment of a portion of the circuit of FIGS. 3-5.

FIG. 8 illustrates an alternate embodiment of a portion of the circuit (including LNA 242 and driver 244) shown in the WLAN block 130 of FIGS. 3-5. As described above in FIGS. 3-5, the LNA 242 is coupled to splitter 243 and then to driver 244. In one implementation, the WLAN block 130 includes a peak detector 802 and comparator 804 that are also coupled to the output of the LNA 242. The peak detector 802 is coupled to the output of the LNA 242. The output of the peak detector 802 is provided to a comparator 804. The comparator 804 provides its output to the WLAN block 130. The peak detector 802 and comparator 804 are configured such that if the comparator 804 triggers, the LNA 242 is deemed to be in saturation. If this happens while bt_rx_frame is asserted, the WLAN AGC will be free to disregard bt_rx_frame until it deasserts and re-asserts in the future, and in the meantime it may change the LNA gains as it likes. Hence, if a very large signal arrives while a small Bluetooth signal is present, and the very large signal puts the LNA into saturation, the Bluetooth signal will likely not be received anyway, so the WLAN block 130 should be allowed to adjust its gain in case the new, large signal is a WLAN signal.

When the WLAN block 130 adjusts the gain of the LNA 242 (and other gain elements), it may size the gain so that the signal has sufficient signal to noise ratio, while also leaving enough headroom for blocking signals (blockers). The term "blockers" refers to other signals that may exist on the medium in nearby frequencies, which the WLAN receiver 130 and BT receiver 140/141 would like to tolerate. Thus the WLAN block 130 may typically adjust the gain to be the minimum gain necessary to receive a signal. However, consider a situation where the Bluetooth block 140 is receiving weak signals, and the WLAN block 130 is receiving stronger signals. Without any modification, the WLAN block 130 may configure a gain setting that provides enough SNR for the WLAN signals, but inadequate SNR for the Bluetooth signals.

FIG. 7 illustrates an embodiment of a method wherein the Bluetooth block 140/141 provides feedback regarding signal to noise ratio of received signals. In one embodiment, at 702 software executing on the Bluetooth block 140/141 periodically accumulates the RSSIs from its communication partners. For example, if the Bluetooth block 140 is primarily communicating with a headset, the Bluetooth block 140/141 gathers information on the average received signal strength indicators (RSSI's) for this headset. At 704 the Bluetooth block 140/141 provides this information to the WLAN block 130, e.g., the average value of the RSSIs. At 706 the WLAN block 130 receives and examines this information and may compare it to the average RSSI that it is receiving from the access point (AP) that it is primarily communicating with. If the WLAN block 130 determines at 708 that its RSSIs are in general higher than the RSSIs experienced by the Bluetooth block 140/141, the WLAN block 130 at 710 may decide to increase the gain of the LNA 424 (and/or change the proportion of the splitter) to provide increased signal strength for the Bluetooth block 140.

For example, the WLAN block 130 may write a value to the WLAN automatic gain control (AGC) block to increase the typical LNA gain setting used to a higher value, thus providing increased signal strength to the Bluetooth block 140. The AGC block determines how to allocate the desired gain among the multiple variable gain blocks, so this input from software allows it to modify how much of the variable gain to allocate to the LNA. For example, if a setting of 10 is requested from software, the AGC may set up to 10 dB more of gain in the LNA than it typically might, and would set a correspondingly lower amount of gain in the rest of the receive chain to compensate. This method may operate at a slow adaptation rate, e.g., not on a per frame basis.

To summarize the above discussion of FIGS. 6 and 7, in some embodiments the Bluetooth (BT) block 140/141 does not directly control the shared LNA 242 on the WLAN block 130, or the optional xLNA 220 or SP3T 206. The WLAN block 130 will generally operate the LNA 242 in a way that it deems appropriate, adapting to changing conditions in the 2.4 GHz band through signal detection at the ADC, and with a peak detector at the LNA output. The BT block 140/141 will react to the WLAN changes in gain by changing the gain of its own receive chain.

One exception is when the BT block 140/141 detects reception of a frame, usually through a valid access code correlation. In this case the BT block 140/141 informs the WLAN block 130 with a signal called bt_rx_frame that it is actively receiving a frame. During reception of the frame (e.g., while the bt_rx_frame signal is asserted), the WLAN block 130 is requested to not change the LNA or splitter gain (or any off-chip gain components like an xLNA), and instead may change other gain blocks after the LNA as it sees fit. This will keep the signal stable for the BT receiver while the frame is being received. Once the BT block 140/141 is done receiving a frame, it will de-assert bt_rx_frame.

In another method, the BT software periodically sends the WLAN software information about the received signal strength (RSSI) of its main communication partner, such as a BT headset it is sending audio to and from. Software executing on the WLAN block 130 will then compare the BT RSSI to the RSSI of its main communication partner, such as the access point that it is communicating with, to determine which is larger and by how much. The software may then write a register in the AGC that will cause the AGC to change how it partitions the gain between the LNA and the rest of the receive path. For example, if the BT RSSI is lower than the WLAN RSSI, more gain than usual might be requested from the LNA if a WLAN signal were to arrive before bt_rx_frame is asserted. This might harm the ability of WLAN to tolerate much larger blockers, but it would help the BT block 140/141 be able to receive its signal if it arrives after the WLAN block 130 has already locked the LNA gain for its own signal. The blocker performance would be decreased, but if these blockers are not detected as being present by the WLAN software, then there is no downside to making this change. Thus this method helps the WLAN block 130 adjust the LNA gain during normal operation.

As discussed above, if the bt_rx_frame signal cannot be created by the BT block 140/141, then other signals from a standard BT/WLAN coexistence interface may be used by the WLAN side to infer bt_rx_frame.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A wireless device, comprising:
an antenna for receiving wireless signals;
first wireless protocol circuitry coupled to the antenna and configured to receive first signals from the antenna, wherein the first wireless protocol circuitry is configured to process the first signals according to the first wireless protocol;
second wireless protocol circuitry coupled to the antenna and configured to receive second signals from the antenna, wherein the second wireless protocol circuitry is configured to process the second signals according to the second wireless protocol;
wherein the first wireless protocol circuitry comprises at least one shared gain element;
wherein when the wireless device is receiving third signals having components according to both the first wireless protocol and the second wireless protocol, the first wireless protocol circuitry is configured to receive the third signals from the antenna, and the at least one shared gain element is configured to amplify the third signals to produce amplified third signals;

wherein at least a first portion of the amplified third signals is processed by the first wireless protocol circuitry, and wherein at least a second portion of the amplified third signals is provided from the first wireless protocol circuitry to the second wireless protocol circuitry for processing;

wherein the second wireless protocol circuitry is configured to provide to the first wireless protocol circuitry information in signal strength of signals received by the second wireless protocol circuitry from the first wireless protocol circuitry;

wherein the first wireless protocol circuitry is configured to dynamically adjust a gain of the at least one shared gain element based at least in part on the information regarding signal strength of signals received by the second wireless protocol circuitry.

2. The wireless device of claim 1, wherein the first wireless protocol circuitry is configured to dynamically adjust the gain of the at least one shared gain element to provide signals of appropriate signal strength to the first wireless protocol circuitry and the second wireless protocol circuitry.

3. The wireless device of claim 2, wherein the second wireless protocol circuitry is configured to indicate to the first wireless protocol circuitry when the second wireless protocol circuitry is actively receiving a packet;

wherein the first wireless protocol circuitry is configured to not adjust the gain of the at least one shared gain element while the second wireless protocol circuitry is actively receiving a packet.

4. The wireless device of claim 3, wherein the first wireless protocol circuitry comprises a peak detector and a comparator coupled to an output of the at least one shared gain element;

wherein the peak detector and the comparator are configured to determine if the at least one shared gain element is saturated;

wherein if the at least one shared gain element is determined to be saturated while the second wireless protocol circuitry is actively receiving a packet, the first wireless protocol circuitry is allowed to adjust the gain of the at least one shared gain element while the second wireless protocol circuitry is actively receiving the packet.

5. The wireless device of claim 1, wherein the at least a first portion of the amplified third signals and the at least a second portion of the amplified third signals do not have significant signal loss relative to the third signals provided by the antenna.

6. The wireless device of claim 1, wherein the first wireless protocol circuitry is comprised on a first semiconductor chip; and wherein the second wireless protocol circuitry is comprised on a second semiconductor chip.

7. The wireless device of claim 1, wherein the first wireless protocol is wireless LAN (WLAN) and the second wireless protocol is Bluetooth.

8. A chip for use in a wireless device, wherein the chip implements a first wireless protocol, wherein the chip is intended to operate in a wireless device that implements the first wireless protocol and a second wireless protocol, the chip comprising:

first wireless protocol circuitry configured to process received signals according to the first wireless protocol;

at least one gain element coupled to the first wireless protocol circuitry;

wherein the chip is operable to receive first signals having only components according to the first wireless protocol;

wherein the first wireless protocol circuitry is configured to process the first signals according to the first wireless protocol;

wherein the chip is operable to receive second signals having components according to both the first wireless protocol and the second wireless protocol;

wherein the at least one gain element is configured to amplify the second signals to produce amplified second signals;

wherein at least a first portion of the amplified second signals is processed by the first wireless protocol circuitry, and wherein at least a second portion of the amplified second signals is provided external to the chip for processing;

wherein the first wireless protocol circuitry is configured to receive information regarding signal strength of signals received by second wireless protocol circuitry;

wherein the first wireless protocol circuitry is configured to dynamically adjust a gain of the at least one gain element based at least in part on the information regarding signal strength of signals received by the second wireless protocol circuitry.

9. The chip of claim 8, wherein the first wireless protocol circuitry is configured to dynamically adjust the gain of the at least one gain element to provide signals of appropriate signal strength to the first wireless protocol circuitry and to provide signals of appropriate signal strength external to the chip for processing.

10. The chip of claim 9, wherein the first wireless protocol circuitry is configured to receive an indication that a packet according to the second wireless protocol is being received;

wherein the first wireless protocol circuitry is configured to not adjust the gain of the at least one gain element while the packet according to the second wireless protocol is being received.

11. The chip of claim 10, wherein the first wireless protocol circuitry comprises a peak detector and a comparator coupled to an output of the at least one gain element;

wherein the peak detector and the comparator are configured to determine if the at least one gain element is saturated;

wherein if the at least one gain element is determined to be saturated while the packet according to the second wireless protocol is being received, the first wireless protocol circuitry is allowed to adjust the gain of the at least one gain element while the packet according to the second wireless protocol is being received.

12. The chip of claim 8, wherein the at least a first portion of the amplified second signals and the at least a second portion of the amplified second signals do not have significant signal loss relative to the second signals.

13. The chip of claim 8, wherein the at least a second portion of the amplified second signals is provided external to the chip to a second chip that implements the second wireless protocol.

14. A method for simultaneously receiving first wireless signals according to a first wireless protocol and second wireless signals according to a second wireless protocol, the method comprising:
    at a first time,
        receiving at a chip first signals having only components according to the first wireless protocol; and
        processing the first signals on the chip according to the first wireless protocol;
    at a second time,
        receiving at the chip second signals having components according to both the first wireless protocol and the second wireless protocol;
        amplifying the second signals to produce amplified second signals, wherein said amplifying is performed by at least one gain element on the chip;
        processing a first portion of the amplified second signals on the chip according to the first wireless protocol;
        providing a second portion of the amplified second signals external to the chip for processing according to the second wireless protocol;
        receiving information regarding signal strength of signals received by second wireless protocol circuitry; and
        dynamically adjusting a gain of the at least one gain element based at least in part on the information regarding signal strength of signals received by the second wireless protocol circuitry.

15. The method of claim 14,
wherein dynamically adjusting the gain of the at least one gain element provides signals of appropriate signal strength to first wireless protocol circuitry on the chip and provides signals of appropriate signal strength external to the chip for processing.

16. The method of claim 14, the method further comprising, at the second time:
    receiving an indication that a packet according to the second wireless protocol is being received;
    wherein said dynamically adjusting the gain of the at least one gain element is not performed while the packet according to the second wireless protocol is being received.

17. The method of claim 16, the method further comprising, at the second time:
    determining that the at least one gain element is saturated;
    wherein the chip comprises a peak detector and a comparator coupled to an output of the at least one gain element, wherein said determining is performed at least in part by the peak detector and the comparator;
    adjusting the gain of the at least one shared gain element while the packet according to the second wireless protocol is being received based on determining that the at least one gain element is saturated.

18. A chip for use in a wireless device, wherein the chip implements a first wireless protocol, wherein the chip is intended to operate in a wireless device that implements the first wireless protocol and a second wireless protocol, the chip comprising:
    first wireless protocol circuitry configured to process received signals according to the first wireless protocol;
    at least one gain element coupled to the first wireless protocol circuitry;
    wherein the chip is operable to receive first signals having only components according to the first wireless protocol;
    wherein the first wireless protocol circuitry is configured to process the first signals according to the first wireless protocol;
    wherein the chip is operable to receive second signals having components according to both the first wireless protocol and the second wireless protocol;
    wherein the at least one gain element is configured to amplify the second signals to produce amplified second signals;
    wherein at least a first portion of the amplified second signals is processed by the first wireless protocol circuitry, and wherein at least a second portion of the amplified second signals is provided external to the chip for processing;
        wherein the first wireless protocol circuitry is configured to dynamically adjust a gain of the at least one gain element to provide signals of appropriate signal strength to the first wireless protocol circuitry and to provide signals of appropriate signal strength external to the chip for processing;
    wherein the first wireless protocol circuitry is configured to receive an indication that a packet according to the second wireless protocol is being received;
    wherein the first wireless protocol circuitry is configured to not adjust the gain of the at least one gain element while the packet according to the second wireless protocol is being received.

19. The chip of claim 18,
wherein the first wireless protocol circuitry comprises a peak detector and a comparator coupled to an output of the at least one gain element;
wherein the peak detector and the comparator are configured to determine if the at least one gain element is saturated;
wherein if the at least one gain element is determined to be saturated while the packet according to the second wireless protocol is being received, the first wireless protocol circuitry is allowed to adjust the gain of the at least one gain element while the packet according to the second wireless protocol is being received.

* * * * *